April 18, 1939.     A. J. LEWIS     2,154,908
CHUCK
Filed June 25, 1937     2 Sheets-Sheet 2
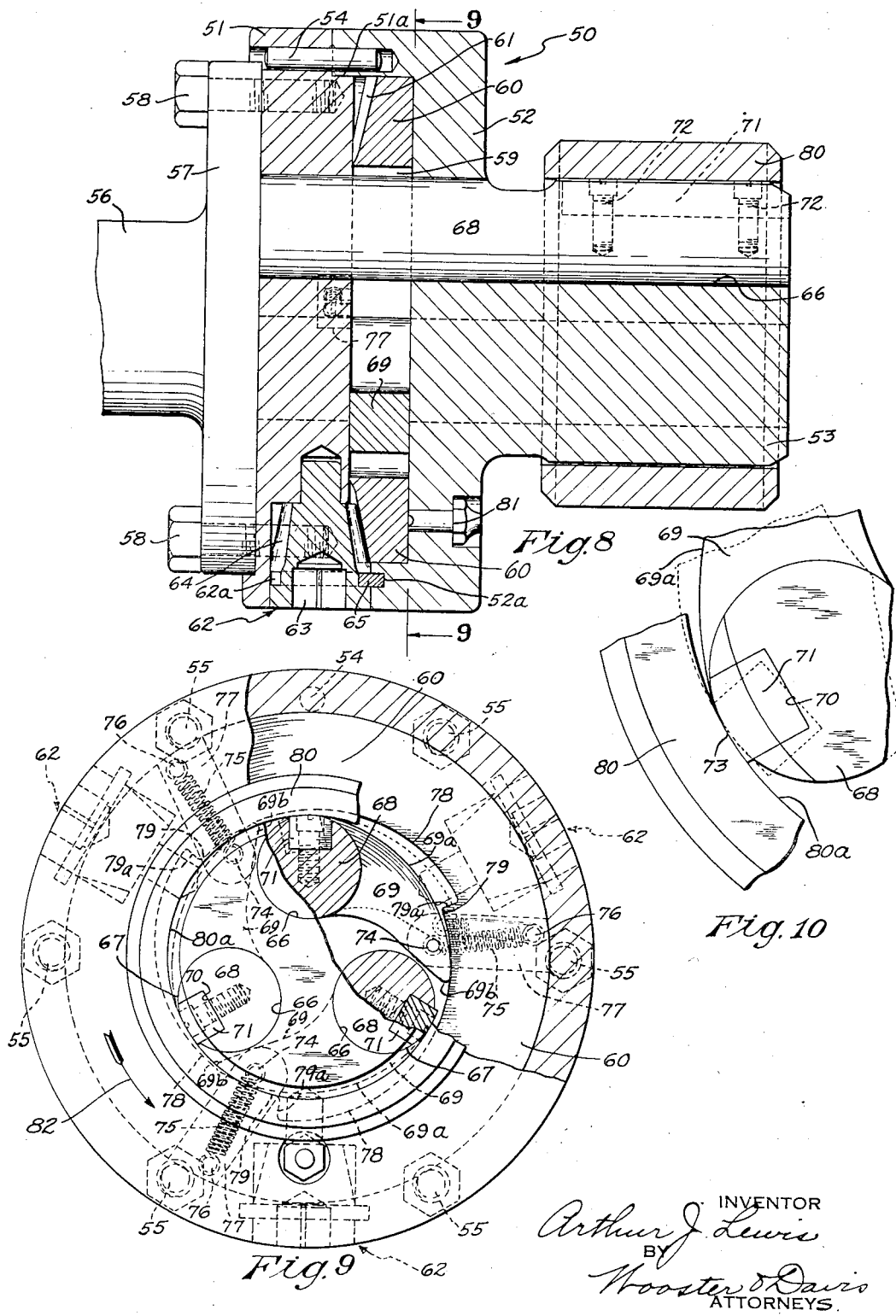

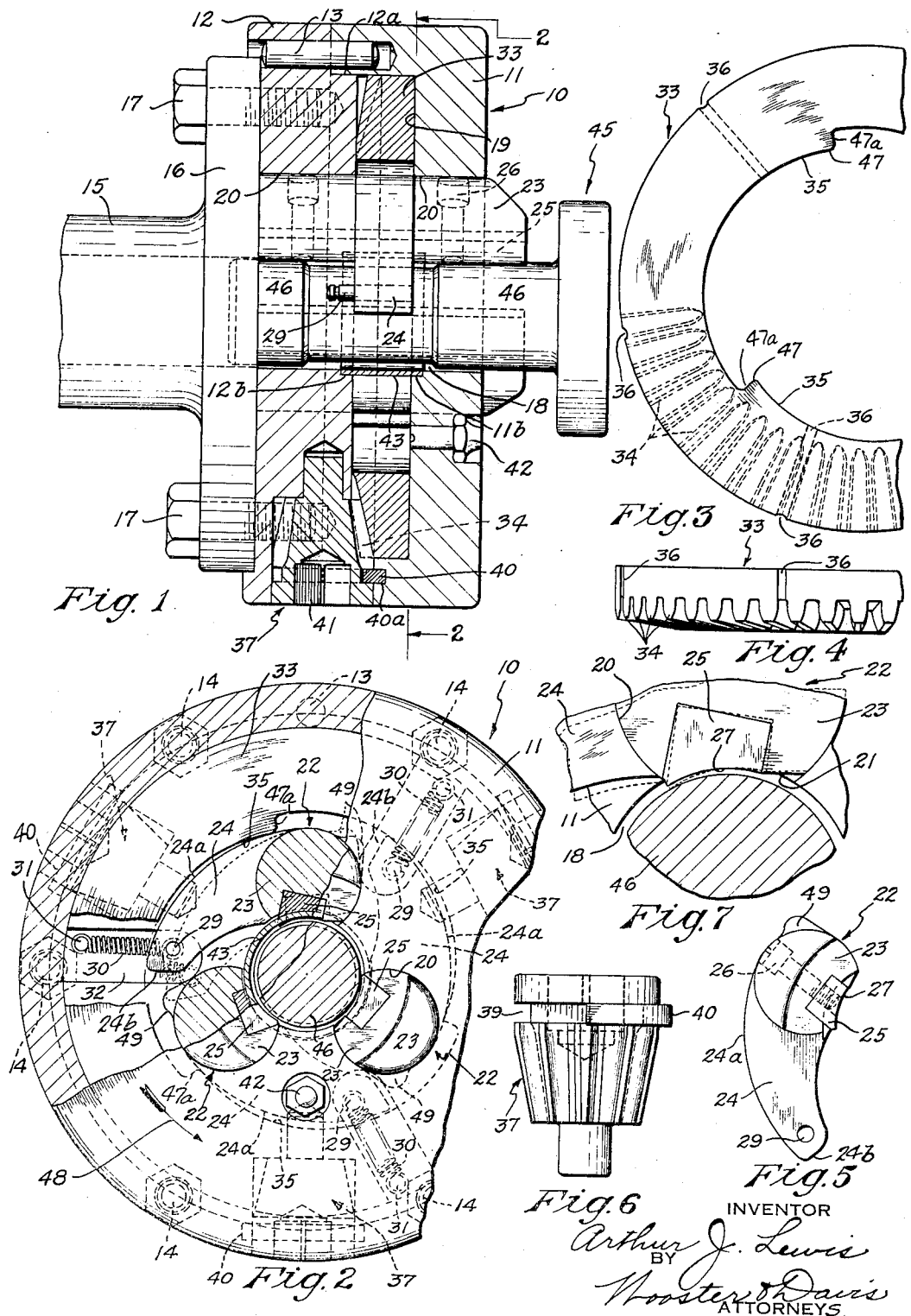
April 18, 1939. A. J. LEWIS 2,154,908
CHUCK
Filed June 25, 1937 2 Sheets-Sheet 1
INVENTOR
Arthur J. Lewis
BY
Wooster Davis
ATTORNEYS.

Patented Apr. 18, 1939

2,154,908

UNITED STATES PATENT OFFICE 2,154,908

CHUCK

Arthur J. Lewis, Stratford, Conn., assignor to The Baird Machine Company, Bridgeport, Conn., a corporation of Connecticut Application June 25, 1937, Serial No. 150,285

17 Claims. (Cl. 279—33)

This invention relates to new and useful improvements in chucks, and comprises a chuck of rather general application adapted for use on any machine requiring a rotating chuck, such for example as a lathe, chucking machines where there are a plurality of work spindles carried by an indexing turret, etc.

An object of the invention is to provide a chuck which is easy to operate, and which holds a piece of work very true and accurate with a strong grip.

Another object is to provide a chuck characterized in that the greater the resistance to a cut being made on a piece of work being held by the chuck, the tighter the chuck grips the work.

Other objects and advantages will become apparent from a consideration of the following detailed description taken in connection with the accompanying drawings wherein satisfactory embodiments of the invention are shown. However, it is to be understood that the invention is not limited to the details disclosed but includes all such variations and modifications as fall within the spirit of the invention and the scope of the appended claims.

In the drawings:

Fig. 1 is a sectional view through one embodiment of my improved chuck as designed for gripping a work piece on the outside thereof;

Fig. 2 is a view looking from the right in Fig. 1 but with parts broken away as along the line 2—2 of Fig. 1;

Fig. 3 is an elevational view showing a portion of a cam employed;

Fig. 4 is an edge view of said cam portion;

Fig. 5 is an end view of one of the jaws employed;

Fig. 6 is an elevational view of an operating pinion employed;

Fig. 7 is an enlarged detail view showing the clamping action of a jaw of the chuck;

Fig. 8 is a view similar to Fig. 1 but showing a modification arranged for gripping the interior surfaces of a hollow member;

Fig. 9 is a view looking from the right in Fig. 8 but with parts broken away as along the line 9—9 of Fig. 8; and Fig. 10 is an enlarged detail view showing the clamping action of one of the jaws of the chuck of Figs. 8 and 9.

Referring in detail to the drawings and at first more particularly to Figs. 1 through 7, the improved chuck comprises a body generally designated 10 and including a chuck face member 11 and a chuck back member 12 held together and against any relative turning movement by a dowel 13 and machine screws 14. The back member also has a reduced portion on its inner face providing a cylindrical wall 12a which telescopes in inner side of the member 11 to hold the members concentric. The chuck may be driven in any suitable manner as by a hollow driving member or shaft 15 having a flange 16 secured to the chuck back 12 by means of machine screws 17.

The chuck body has a work receiving opening 18 therethrough, and the face member 11 is hollowed out on its inner side whereby in the assembled body the back 12 and face member 11 define an annular space 19. Also, in the body 10 in parallel relation with the work receiving opening 18 are a plurality of spaced cylindrical recesses 20 each through one side, as at 21, communicating with the said opening 18.

Arranged in each recess 20 is a jaw 22 comprising an elongated body 23 generally round in transverse section and midway its ends carrying a radially extending arm 24 curved or in the form of an arc as shown in Figs. 2 and 5. In one side the jaw body 23 is provided with a longitudinally extending groove receiving an inset 25 of hardened metal such as steel or any other suitable material secured in place as by machine screws 26.

The exposed faces or edges 27 of the insets 25 are transversely curved (as best shown in Fig. 7) preferably on an arc substantially the same as that of the wall of the opening 18. Therefore when the jaws are in full open position these insets are in the side openings 21 of the recesses 20 and form substantial continuations of the work receiving opening 18. Each of the jaws 22 is turnable about its longitudinal axis in its recess 20 and bears against the walls of its recess, and as it is turned in a counterclockwise direction as viewed in Figs. 2 and 7 is rocked to a clamping position, and thereafter turning of the jaw in the opposite direction results in the insets being carried to released positions.

When the jaws 22 are in the recesses 20 they span the annular space 19 and their arms or lever portions 24 are received in such space. Each arm has a curved outer edge or surface 24a and on its outer or free end portion carries a laterally extending pin 29 to which one end of a coil spring 30 is connected, the other end of such spring being anchored to a pin 31 carried by the body member 12, and the spring itself being accommodated in a recess 32 provided in the member 12 for that purpose.

Within the annular space 19 is a cam 33 in the form of a substantially flat ring having gear teeth 34 on one side face, and on its inner periphery having a cam surface 35 for each jaw 22 employed in the chuck. The cam 33 is provided with oil grooves 36 and is turnable in the space 19, it being arranged about the intermediate portions of the jaws 22 and about the arms 24 of such jaws. At a suitable number of points the chuck body members 11 and 12 are provided with complemental recesses receiving operating pinions 37 the teeth 38 of which mesh with the teeth 34 on the cam 33. Each pinion has a groove 39 into which enters a key 40 seated in a curved recess 40a in the body member 11 whereby the pinion may be rotated but is held in the chuck body.

In the drawings the chuck is shown as provided with three of the pinions 37, although it will be understood that this is a matter of convenience and the number may be varied as desired. In their outer ends the pinions are provided with sockets 41 having angularly related walls whereby the sockets are adapted to receive a suitable wrench for the turning of the pinions whereby to turn the cam 33. Usually these sockets are square or hexagonal to receive the correspondingly shaped head of an operating wrench.

Through a suitable fitting 42 lubricants may be introduced into the annular space 19, and such space is closed off from the work receiving opening 18 as by a bushing 43 clamped between the body members 11 and 12, this bushing seating at its opposite ends in recesses 11b and 12b in the members 11 and 12 so that the opening in the bushing is a continuation of the opening 18. This bushing prevents the escape of lubricant from the space 19 and also, what is probably more important, excludes dirt, chips, or the like from the space 19 so that the cam and other parts in such space are protected. To accommodate the bushing 43 the insets 25 are cut away intermediate their ends as at 44 whereby the insets in effect straddle the bushing.

In the operation of the chuck, assuming that the cam 33 is in released position, the springs 30 acting on the arms 24 have moved the jaws 22 to released positions wherein the hardened insets 25 are substantially withdrawn from the work receiving opening 18. This is substantially the full line position of Figs. 2 and 7. The piece 45 to be acted on is secured in the chuck by inserting the shank 46 of such piece into the work receiving opening 18 of the chuck, and by means of a wrench or the like any one of the pinions 37 is rotated in a direction to turn the cam 33 in a counterclockwise direction as viewed in Fig. 2. This results in the high portions 47 of the cam surfaces 35 riding onto the outer curved edges 24a of the jaw arms 24, with the result that said jaws are turned in their respective recesses against the action of the springs 30. Thus the jaws are turned or rocked to carry the insets 25 into clamping positions and the shank 46 will be tightly held. It will be seen the curved clamping surface 27 of the inset 25 is eccentric to the axis of the member 23 and therefore as member 23 is turned under action of the cam the surface 27, or at least a part of it, is clamped against the outer surface of the work piece.

Since the jaws are turned through the gear means disclosed and the pressure is applied by relatively small angled cams acting through the arms 24 it will be apparent great mechanical advantage is secured and that a relatively slight pressure on the turning tool or wrench will result in the jaws 22 being caused to clamp a piece of work with a very strong grip. Thus a very strong grip is secured with easy operation, and one which holds the work very true and accurate. The chuck during the working operation is to be rotated in the direction of the arrow 48, and when the jaws are in their clamping positions the work, as the shank 46, is engaged by a substantial portion of the area of the arcuate surface 27 of each inset 25. The tool acting on the work 46 tends to rotate it in the opposite direction or against the direction of rotation of the chuck, and as turning of the jaws to gripping position is in the same direction the result is a tendency of the work to turn the jaws in the direction to further tighten them on the work. Thus the greater the resistance offered to a cut being made on a piece of work held by the present chuck the tighter the chuck jaws grip the work. In other words the effect of the tool is to increase the grip.

When the piece of work 45 has been finished the operator turns one of the pinions 37 in the opposite direction to shift the cam 33 back and move the high portions 47 of its cam surfaces 35 inwardly of or in a direction away from the free ends of the arms 24 whereby to permit the springs 30 to act through said arms and rock the jaws 22 into their released positions. On each jaw substantially opposite its arm 24 is a raised piece or projection 49. This projection is in the path of the cam if the jaw should remain in the clamping position, and therefore should any or all of the springs 30 fail of their purpose of releasing the jaws, as the cam 33 is turned back to release these jaws the high parts of the cams will engage such projections on the jaws and force the latter to return to released positions. The backward movement of the cam ring 33 is limited by the shoulders 47a at one side of the high portions of the cams engaging the free ends 24b of the lever arms 24.

Referring now to the form of the invention shown in Figs. 8, 9 and 10, the chuck there shown operates on the same principle as the chuck just described and is in effect expansible to grip interior walls or surfaces of a hollow work piece, instead of the outer surfaces as in the first form. It includes a body generally designated 50 comprising a back member 51 and a face member 52, the latter being provided with a forwardly projecting arbor-like portion or nose 53. In assembling, the face and back may be aligned by a dowel 54 and such parts are connected for rotation together as by means of screws or bolts 55. Also, as in the first form, the back member 51 is receded on its inner face forming a cylindrical wall 51a which telescopes in the rear face of member 52 to hold the members concentric. The chuck may be driven by any desired means as by the tubular shaft 56 having a flange 57 secured to the back 51 of the chuck body by machine screws 58.

The face part 52 of the chuck body is hollowed out or cut away on its inner side whereby when the parts 51 and 52 are connected an annular space 59 is defined between them. In such space is an annular ring-like cam 60 similar to the cam 33 of the figures first described, and on one side is provided with gear teeth 61. Parts 51 and 52 have complemental recesses providing, in the assembled body, for the reception of operating pinions 62 turnable in the body, and in their outer ends having sockets 63, preferably square or hexagonal, for the reception of a wrench, and having their teeth 64 meshing with the teeth 61 on the side of the cam 60. A key 65 associated with each pinion and extending into an annular groove 62a in the pinion and seated in a curved recess 52a in member 52 prevents movement of the pinion out of the body 50. On turning of any of the pinions 62 in one direction or the other the cam 60 will be turned.

At spaced points the body is provided with cylindrical recesses 66, and such are carried through the back 51 and the arbor portion 53. In the arbor portion the recesses open through the outer surface of such portion as at 67. In each recess is a transversely round jaw generally designated 68 and intermediate its ends including a radially extending arm 69 longitudinally curved on its outer edge 69a as shown in Fig. 9. The arms 69 project into the space 59 between the back and face body members or parts 51 and 52, and are arranged within the ring-like cam 60. The portions of the jaws within the arbor portion of the body are each grooved as at 70, and in each such groove is secured a hardened inset 71, the latter being held in place as by machine screws 72.

The outer surfaces 73 of the insets are convex as shown best in Fig. 10 and project through the openings 67 in the outer peripheral surface of the arbor portion 53 of the chuck body. The jaws are turnable about their own longitudinal axis in the recesses 66, and the convex surface 73 is eccentric to the axis of member 68 so that when the jaws are turned in a clockwise direction as viewed in Fig. 9 they move to clamping positions. That is the insets 71 of the jaws are rocked to clamping positions to engage and clamp against the inner surface 80a of a hollow work piece 80.

On the outer or free end portion of each arm 69 is a pin 74 to which is attached one end of a coil spring 75 the other end of which is anchored to a pin 76 carried by the chuck back 51. Such back is provided with recesses 77 to accommodate the springs, and it will be apparent that the springs are constantly tending to pull the arms 69 in a direction to rock the jaws 68 in a counter-clockwise direction, or to released positions.

Three cam surfaces 78, one for each arm 69, are provided on the inner periphery of the cam 60. In Fig. 9 the high portions 79 of such surfaces are on the free end portions of the arms 69 and the jaws 68 are in their clamping positions. That is, the jaws have been rocked in a clockwise direction as the high portions 79 of the cam surfaces 78 rode over the curved edges 69a onto the free ends of the arms 69, and the jaw carried insets 71 have been shifted to their clamping positions. As suggested in Fig. 10 the insets have been shifted from their released dotted line positions to the full line position wherein the insets are clamped against the piece of work 80.

The jaws have been expanded against the inner surface 80a of the work 80, and when the latter is to be removed from the chuck any one of the pinions 62 is turned to rotate the cam 60 in a counter-clockwise direction to carry the high portions of the cam surfaces 78 off the free end portions of the arms 69 and then the springs 75 rock or turn the arms and the jaws to release the work. This backward movement of the cam ring 60 is limited by the shoulders 79a at the side of the high spots 79 engaging the ends 69b of the lever arms 69. Lubricant may be supplied to the cam and parts associated therewith as through a suitable fitting 81. It will be seen the cam surfaces 78 and curved arms 69 have substantially the same shape and relative positions as in the first form of Figs. 1 to 7 and operate in the same manner to give a very great clamping pressure or grip on the work with easy operation of the pinions 62 by the operator.

In use the chuck is rotated in the direction of the arrow 82, and resistance to turning of the work 80 with the chuck by the tool results in a tendency to turn the jaws further to their clamping positions. This is true since, due to the frictional engagement between the jaws and the work, when they do not move together there is a tendency to rock the jaws about their own longitudinal axis in the direction to tighten them. Therefore the greater the resistance to movement of the work 80 with the chuck the tighter the chuck grips the work, the same as described in connection with the first form of Figs. 1 to 7.

In the devices shown the cams and the gripping jaws are operated by hand or manually, but they may be operated automatically or mechanically as well as manually. In either single spindle or multiple spindle machines, including multiple spindle lathes or chucking machines where the spindles are carried in an indexing turret, automatic or mechanical means may be provided to operate the jaws at the completion of the working operation, or in the latter machines the automatic means may operate in certain timed relation with the indexing operation.

Having thus set forth the nature of my invention, what I claim is:

1. In a chuck, a body having a plurality of longitudinally extending recesses therein, a substantially cylindrical jaw in each of said recesses and turnable therein about its longitudinal axis to and from a clamping position, an arm on each of said jaws, a cam carried by said body and mounted to turn about the axis of the body, said cam having cam surfaces eccentric to said axis and operable when turned in one direction to engage said arms and turn said jaws to their clamping positions, and means to turn said cam to clamp the jaws.

2. In a chuck, a body having a plurality of longitudinally extending recesses therein, a substantially cylindrical jaw in each of said recesses and turnable therein about its longitudinal axis to and from a clamping position, an arm on each of said jaws, a cam carried by said body and mounted to turn about the axis of the body, said cam having cam surfaces eccentric to said axis and operable when turned in one direction to engage said arms and turn said jaws to their clamping positions, and a spring connected with each of said arms and operable to turn said jaws to their released positions on turning of said cam back in the opposite direction.

3. In a chuck, a body having a work receiving opening and a plurality of spaced substantially cylindrical recesses about and opening through the sides of said work receiving opening, a jaw in each of said recesses and turnable therein and having bearing against the walls thereof, a hardened inset in each jaw having a curved gripping surface of a curvature similar to that of the opening and a portion of which is projectable into the work receiving opening by turning of the jaw, said jaws adapted to be turned in one direction to bring said insets into clamping positions and in the opposite direction to bring said insets to released positions, a movable cam carried by said body, and means whereby as said cam is turned in one direction and then in the other said jaws are turned to bring the insets to clamping positions and then released positions, and means for actuating said cam.

4. In a chuck, a body having a plurality of spaced substantially cylindrical open sided recesses therein extending longitudinally of the axis of rotation of the chuck, a substantially cylindrical jaw in each of said recesses and turnable therein and including a portion projectable through the open side thereof, said jaws adapted to be turned in one direction to bring said projectable portions into clamping positions, a cam carried by said body mounted to turn about said axis of rotation and having cam surfaces eccentric to said axis adapted when the cam is turned in one direction to cause turning of said jaws to clamping positions and to hold them in such positions, and means for turning said cam.

5. In a chuck, a body having a plurality of spaced substantially cylindrical open sided recesses therein extending longitudinally of the body, a substantially cylindrical jaw in each of said recesses and turnable therein as a bearing and including a portion projectable through the open side thereof, said jaws adapted to be turned in one direction to bring said projectable portions into clamping positions, means constantly tending to retain said jaws in released positions, a cam carried by said body and mounted to turn about the axis of rotation of the body, said cam having cam surfaces eccentric to said axis adapted when the cam is turned in one direction to cause turning of said jaws to clamping positions and to hold them in such positions, and means to actuate said cam.

6. In a chuck, a body having a plurality of spaced substantially cylindrical open sided recesses therein extending longitudinally of the body, a substantially cylindrical jaw in each of said recesses and turnable therein as a bearing and including a portion projectable through the open side thereof, said jaws adapted to be turned in one direction to bring said projectable portions into clamping positions, a cam carried by said body and mounted to turn about the axis of rotation of the body, said cam having cam surfaces eccentric to said axis adapted when the cam is turned in one direction to cause turning of said jaws to clamping positions and to hold them in such positions, means on said jaws to be engaged by said cam on turning of the latter in the opposite direction whereby to move said jaws to released positions, and means for actuating said cam.

7. In a chuck, a rotatable body having spaced open sided recesses therein, a jaw in each of said recesses, a radially extending arm rigid with each of said jaws, said jaws being turnable in said recesses about axes extending longitudinally of the axis of rotation of the body to and from clamping positions and having clamping portions projectable through the open sides of the recesses, a ring-like cam carried by said body mounted to turn about said axis having a cam surface for each of said arms eccentric to said axis and adapted when turned in one direction to have said surfaces ride onto the respective arms and rock the jaws into clamping positions and when turned in the opposite direction to release said arms, spring means for turning said jaws to released positions when said cam is turned in said opposite direction, and means for turning said cam.

8. In a chuck, a rotatable body having spaced open sided recesses therein, a jaw in each of said recesses, a radially extending arm rigid with each of said jaws, said jaws being turnable in said recesses about axes extending longitudinally of the axis of rotation of the body to and from clamping positions and having clamping portions projectable through the open sides of the recesses, a ring-like cam carried by said body mounted to turn about said axis and having a cam surface for each of said arms eccentric to said axis and adapted when the cam is turned in one direction to have said surfaces ride onto the respective arms and rock the jaws into clamping positions and when turned in the opposite direction to release said arms, and means to turn said cam.

9. In a chuck, a two part body comprising a pair of rigidly connected disc-like members, said body having a work receiving opening therein and spaced cylindrical recesses opening through the sides of said work receiving opening, said members defining an annular space between them, a jaw in each of said recesses and including a portion projectable through the open side thereof and movable between clamping and released positions as the jaws are turned in the recesses, a radial arm on each jaw and projecting into said space, a ring-like cam in said space about said jaws and arms and on its inner periphery having a cam surface for each of said arms, means for turning said cam in one direction to have said cam surfaces ride onto said arms and rock said jaws to clamping positions and in the opposite direction to carry said cam surfaces off the arms to permit of movement of the jaws to released positions, and a bushing between said body members and closing the inner periphery of said annular space to close off communication between said work receiving opening and the said space and parts therein.

10. In a chuck, a two part body comprising a pair of rigidly connected members, said body having spaced open sided recesses therein, said members defining an annular space between them, a jaw in each of said recesses and including a portion projectable through the open side thereof and movable between clamping and released positions as the jaws are turned in the recesses, a radial arm on each jaw and projecting into said space, a ring-like cam in said space about said jaws and arms and on its inner periphery having a cam surface for each of said arms, and means for turning said cam in one direction to have said cam surfaces ride onto said arms and rock said jaws to clamping positions and in the opposite direction to carry said cam surfaces off the arms to permit of movement of the jaws to released positions.

11. In a chuck, a two part body comprising a pair of rigidly connected members, said body having spaced open sided recesses therein extending longitudinally of the body, said members defining an annular space between them, a jaw in each of said recesses having a bearing on the surfaces thereof and including a portion projectable through the side thereof and movable between clamping and released positions as the jaws are turned in the recesses, a radial arm on each jaw and projecting into said space, a ring-like cam in said space about said jaws and arms and on its inner periphery having a cam surface for each of said arms, means for turning said cam in one direction to have said cam surfaces ride onto said arms and rock said jaws to clamping positions and in the opposite direction to carry said cam surfaces off the arms to permit of movement of the jaws to released positions, and springs connected with said arms and constantly tending to shift them to turn the jaws to released positions.

12. In a chuck, a body having spaced open sided substantially cylindrical recesses therein extending longitudinally of the body, said body comprising a pair of rigidly connected parts defining a space between them, a jaw in each of said recesses having a bearing on the surfaces thereof and including a portion projectable through the open side thereof and movable between clamping and released positions as the jaws are turned in the recesses, a radial arm on each of said jaws and projecting into said space, a ring-like cam in said space about said jaws and arms and on its inner periphery having a cam surface for each of said arms, said cam being turnable in one direction to have said cam surfaces ride onto said arms and rock said jaws to clamping positions and in the opposite direction to carry said cam surfaces off the arms to permit of movement of the jaws to released positions, gear teeth on said cam, and a pinion mounted in said body and meshing with said gear teeth for turning of said cam in each of said directions.

13. In a chuck, a body having longitudinally extending recesses each provided with a side opening through the surface of said body, a jaw on each of said recesses, each of said jaws having a clamping portion projectable through the side opening of the recess of said jaw, said jaws being turnable in said recesses about axes extending longitudinally of the chuck to carry said portions to and from clamping positions, means for turning said jaws to and from clamping positions, said means including a lever arm on each of said jaws, a cam having a cam surface eccentric to the axis of the body associated with each of said arms and turnable about said axis to actuate the arms to turn said jaws to their clamping positions, and means to turn said cam.

14. In a chuck, a body having a plurality of longitudinally extending recesses, a clamping jaw in each recess mounted to turn about an axis extending longitudinally of the axis of the chuck, an arm on each of said jaws, a ring cam mounted for turning movements about the axis of the chuck and having cam surfaces engaging said arms, and means for turning the cam to operate the jaws.

15. In a chuck, a body having a plurality of substantially cylindrical recesses extending longitudinally of the axis of the chuck, a substantially cylindrical jaw mounted in each recess to turn therein, an arm on each jaw, a ring cam embracing the jaws and mounted for turning movements about them, circumferentially extending cam surfaces carried by the cam and engaging said arms, and means for turning the cam to turn the jaws.

16. In a chuck, a body having a plurality of substantially cylindrical recesses extending longitudinally of the body, a plurality of substantially cylindrical jaws carried by said body in said recesses for turning movements between clamping and released positions, said jaws being turnable to clamping positions by movements in such directions that resistance to turning movements of a piece being held by the jaws results in a tendency of said jaws to turn further in the clamping directions, a cam carried by said body and mounted to turn about the axis of the body, means for turning the cam, said cam having cam surfaces eccentric to said axis and means cooperating with said surfaces whereby as the cam is turned in one direction it causes simultaneous turning of all of said jaws to their clamping positions.

17. In a chuck, a body having a work receiving opening and a plurality of spaced substantially cylindrical recesses about and opening through the sides of said work receiving opening, a jaw in each of said recesses and turnable therein and having bearing against the walls thereof, each jaw having a curved gripping surface of a curvature similar to that of the opening and a portion which is projectable into the work receiving opening by turning of the jaw, said jaws adapted to be turned in one direction to bring said gripping surfaces into clamping positions and in the opposite direction to bring them to released positions, a movable cam carried by said body, and means whereby as said cam is turned in one direction and then in the other said jaws are turned to bring the gripping surfaces to clamping positions and then released positions, and means for actuating said cam.

ARTHUR J. LEWIS.